G. REUTHE.
ELECTRIC CONDENSER.
APPLICATION FILED MAR. 24, 1915.
1,151,824.
Patented Aug. 31, 1915.
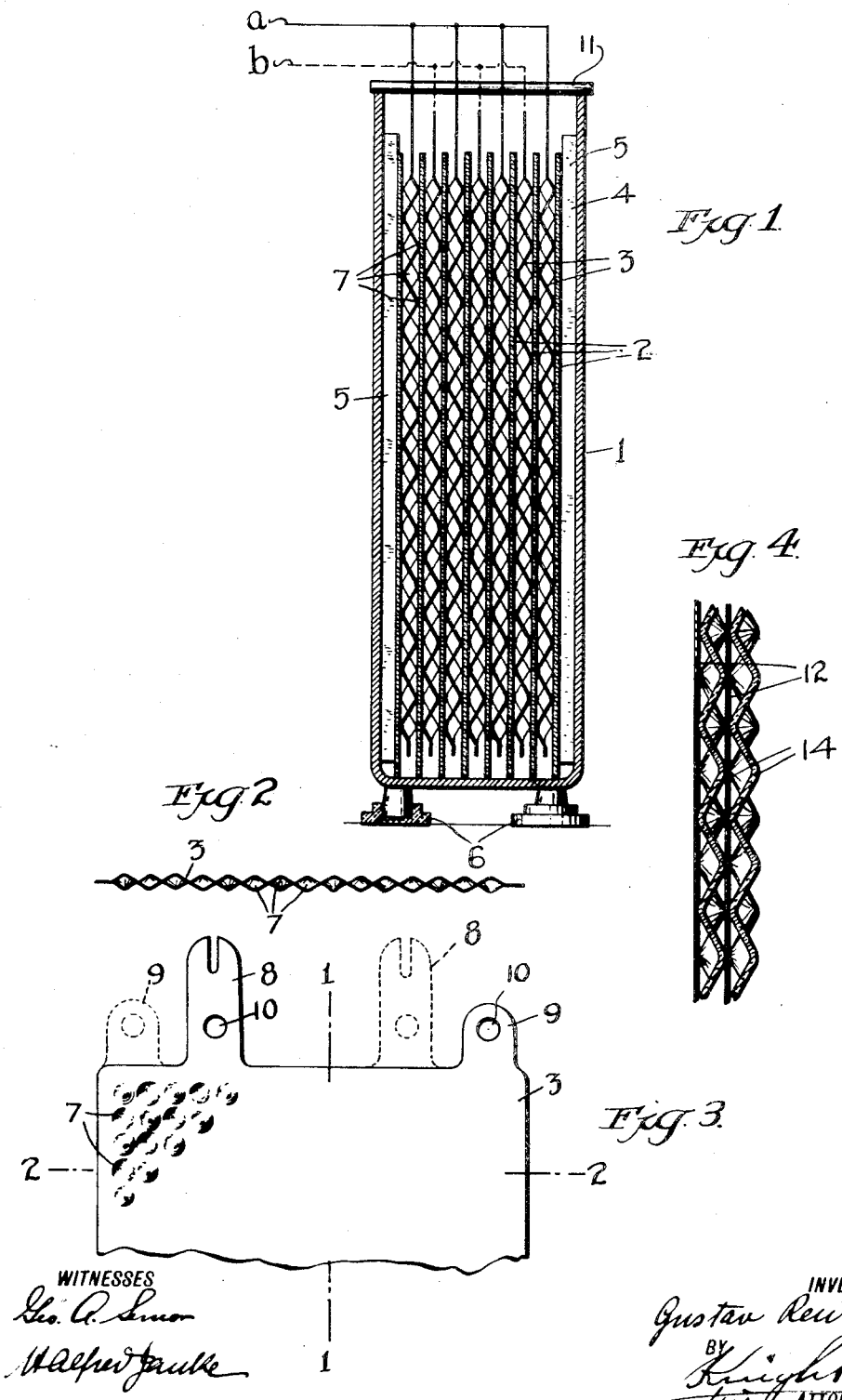

UNITED STATES PATENT OFFICE.

GUSTAV REUTHE, OF SAYVILLE, NEW YORK, ASSIGNOR TO GESELLSCHAFT FÜR DRAHTLOSE TELEGRAPHIE M. B. H., OF BERLIN, GERMANY.

ELECTRIC CONDENSER.

1,151,824.  Specification of Letters Patent.  Patented Aug. 31, 1915.

Application filed March 24, 1915. Serial No. 16,653.

*To all whom it may concern:*

Be it known that I, GUSTAV REUTHE, a subject of the German Emperor, and residing in Sayville, in the county of Suffolk and State of New York, have invented certain new and useful Improvements in Electric Condensers, of which the following is a full and clear specification, illustrated by the annexed drawings, the particular novel features being more fully set forth in the annexed claims.

My invention relates in particular to that class of condensers which is now being commercially manufactured for the purpose of wireless telegraphy and kindred arts.

Also in particular, my invention relates to that class of condensers wherein the dielectric and the conductor have both substantially the form of plates, instead of in the form of jars such as the well known Leyden jars. In the class of plate condensers in which oil is also used and which serve in circuits carrying large amounts of electric energy such as are especially employed in transmitters for wireless telegraphy, there are several types which have peculiar characteristics. Mechanically there may be distinguished condensers in which the effective metal surfaces are represented either by solid, stiff plates, or also by thin sheet metal, or by thin flexible metal foil. Accordingly these effective metal surfaces are arranged in the assembled condenser, either self-supporting (such as stiff metal plates), or they are disposed between stiff insulating plates (in case of thin metal sheets) or, (in case of metal foil) they are pasted or otherwise suitably attached to stiff plates of insulating material. If dielectrics are used in such condensers, either solid insulating plates, preferably glass, liquid dielectrics such as oil, or both kinds are simultaneously used. Also in case of condensers in which a solid dielectric is intended, frequently oil is also used, but in this case only for cooling purposes and for avoiding the detrimental brush discharges. In all these condensers principally the conditions must be fulfilled that in order to utilize the available amount of condenser material as fully and economically as possible it is necessary that the dielectric is of equal value at all points, so that between the metal elements of the condenser the dielectric strength and the resistance to the electric lines of force is at all points the same. It is, of course, necessary that also the losses in the dielectric are as small as possible which condition can be fulfilled only by taking care that for building up the condenser, aside from the metal plates themselves, only first class dielectric material is used. If solid dielectric plates such as glass or the like are used, it is very difficult to avoid undesirable foreign material between the metal and the dielectric. This foreign matter may in many cases considerably lessen the electric value of the condenser. For instance, in case paste is used for attaching metal foil to glass plates, very great dielectric losses may occur. Also it is extremely difficult in this case to avoid small air blisters between the foil and the fixed dielectric. Since air, as is well known, has a very small dielectric value and a small dielectric strength, the air, owing to brush discharges, is already heated at comparatively small load. If in such case glass plates are used as dielectric they are cracked at such points of undue heating. If only liquid dielectric is used one can rely for the secure lateral position of the metal electrodes only upon their own stiffness. With such stiff electrodes it has been found in the commercial manufacturing of condensers, especially for high power stations, that they become very expensive and also very voluminous. They become expensive especially because the stiff metal plates must be straightened by hand with the greatest care so as to take out any warp, otherwise the distance between two adjacent electrodes may be smaller at certain points than intended, which lessens the load capacity of the condenser.

It has been already suggested to use rigid dielectric plates, immersed in a liquid dielectric and to use as electrodes stiff metal plates between the dielectric plates, which are provided at a few points near their edges with means for maintaining the proper distances between the electrodes and the insulating plates. Such means may for instance be raised portions near the edges of the plates. However, this construction again requires metal plates of considerable thickness, on account of the lack of lateral support of the entire inner portion of the plate. Besides, these plates, as pointed out above, must be carefully straightened and owing to this requirement the assembled condenser is mechanically very sensitive against displacement of the electrode surfaces. According to the present invention all these disadvantages are overcome.

My novel arrangement comprises in its preferred form ordinary thin sheet metal electrode plates disposed between rigid dielectric plates, the entire surface of the metal electrodes being so deformed that the entire surface of each plate when placed between the insulating plates is secured at substantially all points against lateral displacement. This effect is obtained best by providing the sheet metal with slight indentations disposed alternating in opposite directions, preferably closely adjacent to each other so that each transverse straight sectional line through the sheet in any direction forms a corrugated line. These indentations must be of equal depth and be uniformly distributed over the entire sheet, and in assembling a number of such sheets to a condenser, all indentations pointing in one direction, must be in alinement with the corresponding indentations of adjacent plates on a transverse line at right angles to the sheet for reasons to be explained later on. The assembled pack of electrodes and dielectric plates is then placed into a suitable casing filled with oil as will be described later more fully. The advantage of this construction is that any foreign material (such as spacing elements of wood or other suitable material) which has a dielectric strength different from the material used for the dielectric plates or from the liquid dielectric is entirely avoided. If such foreign material such as particles of wood, metal or even air bubbles, should get between the plates by accident, it can easily escape upwardly or downwardly. Moreover, if in such a condenser, a straight transverse line is drawn at any point at right angles to the assembled plates, the total sum of all oil layers between adjacent plates on such line is equal on all points of the condenser. Furthermore, the oil which serves as a dielectric is able to freely circulate over all points of each plate and insures excellent cooling. If, as I prefer to do, glass plates are used for the rigid dielectric, they are in this case subject to only a small dielectric strain and serve principally as a lateral support for the sheet metal electrodes. For this reason I am able to use, so far as dielectric quality is concerned, glass of the cheapest quality, taking care merely to insure reasonable mechanical strength of the glass.

Moreover any tendency of a few plates, in the assembled pack, to warp owing to unequal pressure against the pack by the spacing pieces which aline the pack relatively to the walls of the container, has no effect upon the spacing between the individual elements of the condenser. Thus in my novel arrangement the electric losses of the condenser are solely determined by the comparatively very small dielectric losses in the oil.

Through comparative tests with large amounts of high frequency energy I have found that my condenser will withstand many times the load which plate condenser of types heretofore used will stand.

In the accompanying drawings:—Figure 1 represents a transverse vertical section through an assembled condenser on the line 1—1, Fig. 3. Fig. 2 represents a horizontal section through a plate on the line 2—2 Fig. 3. Fig. 3 represents a full view of the upper portion of a sheet metal electrode plate, and Fig. 4 represents a modification of the relative arrangement of electrodes and dielectric plates the section being taken similarly to that shown in Fig. 1.

In Fig. 1, 1 is a metal container supported on insulating feet 6 of glass, porcelain or the like. In the container the rigid dielectric plates 2, preferably glass, are placed alternately with the electrodes 3 of thin sheet metal. These electrodes are provided with slight indentations 7 alternating in opposite direction and closely adjacent to each other as shown in Figs. 1 and 3, and they are of course all of the same depth, so that corresponding to the indentations on one side of the sheet, humps of equal height are produced on the opposite side, which alternate with the indentations of that side. Thus a sectional line drawn straight in any direction on the plate will form a corrugated line. By this deformation of the sheet metal substantially all points of the sheet are laterally supported by the rigid insulating plates 2 and free circulation of the oil is still insured. Each electrode is provided at the top with two lugs 8 and 9 into which holes 10—10 are punched to permit convenient vertical support of the electrodes as for instance by insulating rods 11 (Fig. 1). In Fig. 3 the lugs 8 and 9 of the succeeding electrode are indicated in dotted lines. Lugs 8 of all plates serve beside for connecting the electrodes in circuit as diagrammatically indicated in Fig. 1 at $a$ and $b$. In assembling the electrodes, it is important that the corresponding indentations of all plates, pointing in one direction register in a transverse line at right angles to the plates so that the distances between all electrodes at right angles to their surfaces are at all points the same. The dielectric plates 2 on either side of the assembled pack are spaced a suitable distance from the container 1 by strips 5 of wood or similar suitable material.

By the arrangement as just described I find that brush discharges within the condenser are entirely avoided, so that the glass plates are not subject to destruction on that account, which is otherwise a common defect of that class of condensers.

While I have described and shown as a preferred form the metal plates as provided with the indentations, it is obvious that the same effect and the same advantage may be obtained by using straight thin sheet metal electrodes and by providing the rigid dielectric plates with the indentations of the character described. This is shown in Fig. 4 wherein 14 represents the rigid dielectric plates and 12 the straight sheet metal electrodes. The construction may be otherwise the same as described before.

What I claim is:—

1. A condenser of the character described consisting of a pack of thin sheet metal electrode plates and rigid dielectric plates both alternating with each other and being immersed into a liquid dielectric, one kind of said plates having closely adjacent indentations of equal depth and alternating in direction, all indented plates having their indentations, pointing in one direction, in alinement with the corresponding indentations of the adjacent plates on a straight line at right angles to the pack.

2. A condenser of the character described, consisting of a pack of thin sheet metal electrode plates and rigid dielectric plates both alternating with each other and being immersed into a liquid dielectric, said electrode plates having closely adjacent indentations of equal depth and alternating in direction, said electrodes being disposed in the pack with their indentations, pointing in the same direction, in alinement with the corresponding indentations of the adjacent electrodes on a straight line at right angles to the pack, and means for holding said electrodes in alinement.

GUSTAV REUTHE.

Copies of this patent may be obtained for five cents each, by addressing the "Commissioner of Patents, Washington, D. C."